US012811535B2

(12) United States Patent
Norimatsu et al.

(10) Patent No.: US 12,811,535 B2
(45) Date of Patent: Nov. 24, 2026

(54) MOTOR DRIVE DEVICE AND REFRIGERATION CYCLE APPARATUS

(71) Applicant: Mitsubishi Electric Corporation, Tokyo (JP)

(72) Inventors: Yasuharu Norimatsu, Tokyo (JP); Takaaki Takahara, Tokyo (JP); Shinya Toyodome, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 175 days.

(21) Appl. No.: 18/721,489

(22) PCT Filed: Feb. 24, 2022

(86) PCT No.: PCT/JP2022/007717

§ 371 (c)(1),
(2) Date: Jun. 18, 2024

(87) PCT Pub. No.: WO2023/162106

PCT Pub. Date: Aug. 31, 2023

(65) Prior Publication Data

US 2025/0219564 A1 Jul. 3, 2025

(51) Int. Cl.

*H02P 27/12* (2006.01)
*F25B 49/02* (2006.01)
*H02M 5/45* (2006.01)

(52) U.S. Cl.

CPC ............ *H02P 27/12* (2013.01); *F25B 49/025* (2013.01); *H02M 5/4505* (2013.01); *H02P 2201/01* (2013.01)

(58) Field of Classification Search

CPC ...... H02P 27/12; H02P 2201/01; H02P 21/22; H02P 29/60; H02P 27/085; F25B 49/025; H02M 5/4505

(Continued)

(56) References Cited

U.S. PATENT DOCUMENTS 7,952,308 B2 5/2011 Schulz et al.
8,988,024 B2 * 3/2015 Konig ........................ H02P 6/16 318/400.17

(Continued)

FOREIGN PATENT DOCUMENTS

JP 2002-247873 A 8/2002
JP 2006-288035 A 10/2006
JP 2014-124042 A 7/2014

OTHER PUBLICATIONS

International Search Report of the International Searching Authority mailed May 10, 2022 in corresponding International Patent Application No. PCT/JP2022/007717 (and English translation).

(Continued)

*Primary Examiner* — David Luo
(74) *Attorney, Agent, or Firm* — Posz Law Group, PLC

(57) ABSTRACT

A motor drive device includes a rectifier unit that rectifies first AC power supplied from a commercial power supply, an inverter that generates second AC power and output the second AC power to a motor, and a control unit that controls the operation of the inverter such that pulsation according to the power state of a capacitor is superimposed on a drive pattern of the motor, to reduce a charge and discharge current of the capacitor. The control unit performs load pulsation compensation control to compensate for load pulsation, power supply pulsation compensation control to reduce the charge and discharge current of the capacitor, and overload compensation control to reduce an inverter input current input to the inverter, while preferentially performing constant current load control to control the rotational speed of the motor.

19 Claims, 5 Drawing Sheets

(58) Field of Classification Search
USPC .......................................... 318/812, 767, 727
See application file for complete search history.

(56) References Cited

U.S. PATENT DOCUMENTS

| | | | | |
|---|---|---|---|---|
| 9,214,881 | B2 * | 12/2015 | Sekimoto | H02M 1/12 |
| 10,270,380 | B2 * | 4/2019 | Uemura | H02M 7/53871 |
| 11,043,905 | B2 * | 6/2021 | Ono | H02M 1/4208 |

OTHER PUBLICATIONS

Office Action mailed on Jun. 17, 2026 for the corresponding Indian Patent Application No. 202427061982 (and English Translation).

Jung et al., "Control of Three-Phase Inverter for AC Motor Drive With Small DC-Link Capacitor Fed by Single-Phase AC Source," IEEE Transactions On Industry Applications, vol. 50, No. 2, Mar./Apr. 2014, pp. 1074-1081.

* cited by examiner

MOTOR DRIVE DEVICE AND REFRIGERATION CYCLE APPARATUS

CROSS-REFERENCE TO RELATED APPLICATION

This application is a U.S. national stage application of PCT/JP2022/007717 filed on Feb. 24, 2022, the contents of which are incorporated herein by reference.

FIELD

The present disclosure relates to a motor drive device that includes a power converter for converting input AC power into desired power to a motor and drives the motor, and a refrigeration cycle apparatus.

BACKGROUND

Using a large-capacitance capacitor generally leads to increases in the size and cost of power converters. There have been known power converters intended to reduce the capacitance of a capacitor of a smoothing unit provided between a converter and an inverter.

For example, the following Patent Literature discloses a technique of providing a phase difference between a carrier for converter-side pulse width modulation (PWM) control and a carrier for inverter-side PWM control, and adjusting the phase difference to maximize an area where both pulses coincide with each other. Patent Literature 1 describes that current flowing through the capacitor of the smoothing unit can be minimized, so that the capacitance of the capacitor of the smoothing unit is minimized.

PATENT LITERATURE

Patent Literature 1: Japanese Patent Application Laid-open No. 2006-288035

However, as a characteristic of motor drive devices, it is necessary to increase inverter current flowing through the inverter in a high load range where the load on the motor is large. In such a high load range, current flowing from the capacitor of the smoothing unit also inevitably increases, so that it is difficult to minimize current flowing through the capacitor of the smoothing unit. Therefore, when a small-capacitance capacitor is used, a problem such as a failure of the capacitor due to a temperature rise may occur particularly under a high outside temperature environment where the outside temperature is high.

As described above, the technique of Patent Literature 1 has difficulty in driving in the high load range and under the high outside temperature environment, and has a problem that the reliability of the device decreases when a small-capacitance capacitor is used.

SUMMARY

The present disclosure has been made in view of the above. It is an object of the present disclosure to provide a motor drive device that can prevent a decrease in the reliability of the unit even in driving in the high load range and under the high outside temperature environment.

To solve the above-described problem and achieve the object, a motor drive device according to the present disclosure includes a rectifier unit, a capacitor connected to an output end of the rectifier unit, an inverter connected across the capacitor, and a control unit. The rectifier unit rectifies first AC power supplied from a commercial power supply. The inverter generates second AC power and outputs the second AC power to a motor. The control unit controls the operation of the inverter such that pulsation according to the power state of the capacitor is superimposed on a drive pattern of the motor, to reduce a charge and discharge current of the capacitor. The control unit performs load pulsation compensation control to compensate for load pulsation, power supply pulsation compensation control to reduce the charge and discharge current of the capacitor, and overload compensation control to reduce an inverter input current input to the inverter, while preferentially performing constant current load control to control the rotational speed of the motor.

The motor drive device according to the present disclosure achieves the effect of being able to prevent a decrease in the reliability of the unit even in driving in the high load range and under the high outside temperature environment.

DETAILED DESCRIPTION

Hereinafter, a motor drive device and a refrigeration cycle apparatus according to embodiments of the present disclosure will be described in detail with reference to the accompanying drawings. Note that the embodiments described below are exemplifications, and the scope of the present disclosure is not limited by the following embodiments.

First Embodiment

Figure 1:
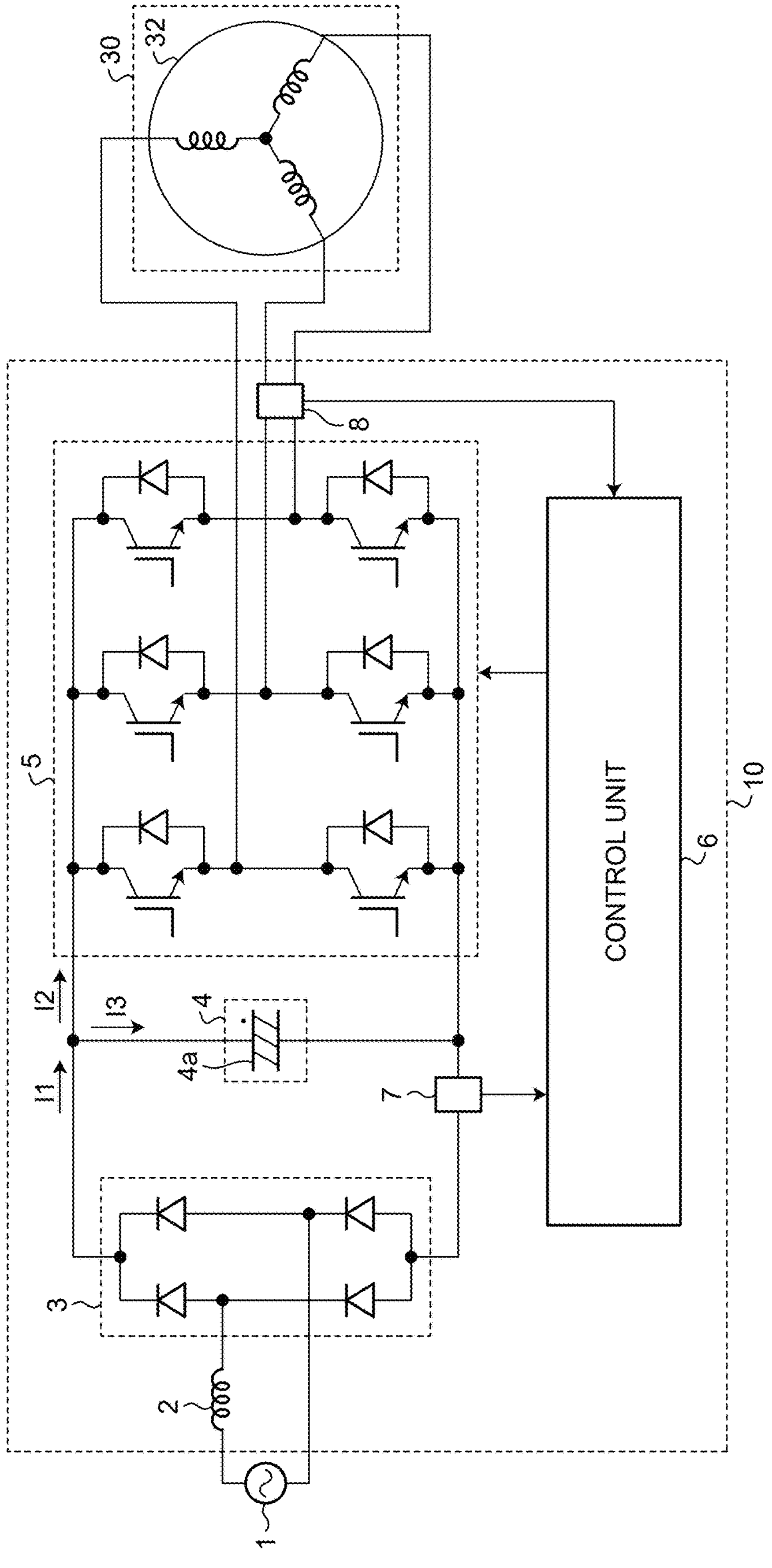
FIG. 1 is a diagram illustrating an exemplary configuration of a motor drive device according to a first embodiment.

FIG. 1 is a diagram illustrating an exemplary configuration of a motor drive device according to a first embodiment. In FIG. 1, a motor drive device 10 according to the first embodiment is connected to a commercial power supply 1 and a compressor 30. The motor drive device 10 converts first AC power supplied from the commercial power supply 1 into second AC power having a desired amplitude and desired phases, and supplies the second AC power to the compressor 30. The commercial power supply 1 is an example of an AC source. A motor 32 is installed in the compressor 30. An example of the motor 32 is a sensorless brushless motor.

The motor drive device 10 includes a reactor 2, a rectifier unit 3, a smoothing unit 4, an inverter 5, a control unit 6, and current detection units 7 and 8.

The reactor 2 is connected between the commercial power supply 1 and the rectifier unit 3. The rectifier unit 3 includes a bridge circuit composed of four rectifier elements, and rectifies the first AC power supplied from the commercial power supply 1 for output. The rectifier unit 3 performs full-wave rectification.

The smoothing unit 4 is connected to an output end of the rectifier unit 3. The smoothing unit 4 includes a capacitor 4*a* as a smoothing element, and smooths the power rectified by the rectifier unit 3. The capacitor 4*a* is, for example, an electrolytic capacitor, a film capacitor, or the like. The capacitor 4*a* is connected to the output end of the rectifier unit 3 and has a capacitance to smooth the power rectified by the rectifier unit 3. The waveform of the power supply voltage output by the commercial power supply 1 is a full-wave rectified waveform, whereas a voltage waveform generated in the capacitor 4*a* by smoothing is a waveform in which voltage ripple corresponding to the frequency of the commercial power supply 1 is superimposed on a DC component, and does not greatly pulsate. When the commercial power supply 1 is a single-phase one, the frequency of the voltage ripple has, as the main component, a component twice the frequency of the power supply voltage. When the commercial power supply 1 is a three-phase one, the frequency of the voltage ripple has, as the main component, a component six times the frequency of the power supply voltage. When the power input from the commercial power supply 1 and the power output from the inverter 5 do not change, the amplitude of the voltage ripple is determined by the capacitance of the capacitor 4*a*. For example, the amplitude of the voltage ripple generated in the capacitor 4*a* pulsates in such a range that its maximum value is less than twice its minimum value.

The inverter 5 is connected across the smoothing unit 4. The inverter 5 includes switching elements and freewheeling diodes. Specific examples of the switching elements are semiconductor devices such as insulated-gate bipolar transistors (IGBTs) or metal-oxide semiconductor field-effect transistors (MOSFETs), and are formed of a silicon semiconductor. Other than the silicon semiconductor, a wide bandgap semiconductor may be used. The wide bandgap semiconductor refers to a semiconductor having a bandgap larger than the bandgap of silicon. A typical wide bandgap semiconductor is silicon carbide (SiC), gallium nitride (GaN), gallium oxide ($Ga_2O_3$), or diamond. Using a wide bandgap semiconductor can reduce losses as compared with using a silicon semiconductor. In the inverter 5, the switching elements are on-off controlled by the control of the control unit 6. By this control, the power output from the rectifier unit 3 and the smoothing unit 4 is converted into the second AC power having an amplitude and phases different from those of the first AC power, according to the load on the motor 32, and is output to the compressor 30.

The current detection unit 7 detects a capacitor input current I1 output from the rectifier unit 3 to the smoothing unit 4 and the inverter 5, and outputs the detected current value to the control unit 6. The current detection unit 7 can be used as a detection unit that detects the power state of the capacitor 4*a*.

The current detection unit 8 detects the current values of two phases of three-phase currents output from the inverter 5, and outputs the detected current values to the control unit 6. When the detected current values are a U-phase current Iu and a V-phase current Iv, the current value of a W-phase current Iw that is the remaining one phase can be obtained by calculation from the relational expression $Iu+Iv+Iw=0$. Sensors used in the current detection unit 8 may be sensors such as direct current current transducers (DCCTs), alternating current current transducers (ACCTs), or shunt resistors, but are not limited to them. Sensors other than these may be used as long as the three-phase current values can be detected.

Figure 2:
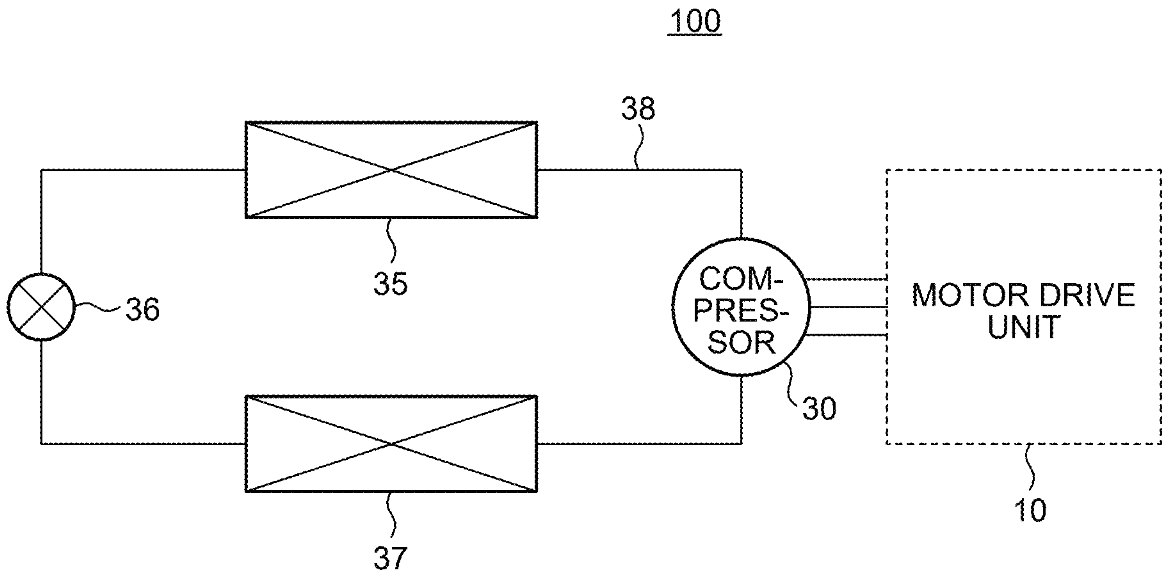
FIG. 2 is a diagram illustrating an exemplary configuration in which the motor drive device according to the first embodiment is applied to a refrigeration cycle apparatus.

FIG. 2 is a diagram illustrating an exemplary configuration in which the motor drive device according to the first embodiment is applied to a refrigeration cycle apparatus. In FIG. 2, a refrigeration cycle apparatus 100 includes the motor drive device 10 according to the first embodiment. The refrigeration cycle apparatus 100 can be applied to a product including a refrigeration cycle, such as an air conditioner, a refrigerator, a freezer, or a heat pump water heater.

In the refrigeration cycle apparatus 100, the compressor 30 incorporating the motor 32, a condenser 35, an expansion valve 36, and an evaporator 37 are installed via refrigerant piping 38. The compressor 30, the condenser 35, the expansion valve 36, and the evaporator 37 are connected in a closed loop, forming a refrigerant circuit. Although not illustrated, installing a four-way valve between the compressor 30 and the condenser 35 allows the evaporator 37 and the condenser 35 to be interchanged between an indoor unit and an outdoor unit, and allows switching between heating operation and cooling operation.

The compressor 30 includes a refrigerant compression chamber (not illustrated). In the refrigerant compression chamber, a machine for compressing a refrigerant is provided. An inlet and an outlet (not illustrated) are connected to the compressor 30, constituting part of the refrigerant circuit. The motor 32 that drives the compressor 30 includes a stator and a rotor (not illustrated). The stator has a structure in which coils are wound around a yoke. The rotor is formed of members having the function of permanent magnets. By the driving of the motor 32, the machine for compressing the refrigerant is driven, and the refrigerant flowing in from the inlet is compressed in the compression chamber and flows out from the outlet. FIG. 1 illustrates a case where motor windings in the motor 32 are Y-connected, but the present invention is not limited to this example. The motor windings in the motor 32 may be Δ-connected, or may be designed to be switchable between Y connection and Δ connection.

As the compressor 30, a compressor that allows rotational speed control, that is, an inverter-driven compressor is used in which the rotational speed of the motor 32 is controlled by the inverter 5. Examples of the inverter-driven compressor include a rotary compressor, a scroll compressor, and a reciprocating compressor. The drive characteristics of these compressors are affected by the types of the refrigerant and lubricating oil, the amount of the lubricating oil, etc. Therefore, depending on conditions, the torque required to operate the refrigerant compression chamber increases, so that the output voltage by the control increases.

Figure 3:
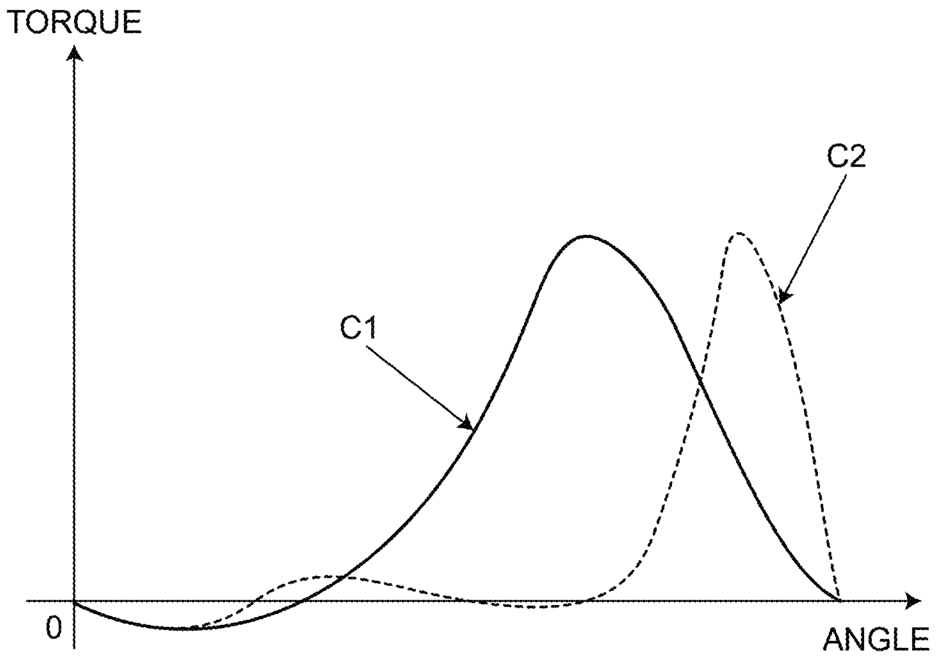
FIG. 3 is a diagram for explaining torque of a rotary compressor and a reciprocating compressor that are examples of a compressor included in the refrigeration cycle apparatus illustrated in FIG. 2.

FIG. 3 is a diagram for explaining torque in a rotary compressor and a reciprocating compressor that are examples of the compressor included in the refrigeration cycle apparatus illustrated in FIG. 2. In a graph illustrated in FIG. 3, the vertical axis represents torque, and the horizontal axis represents an angle representing the rotational position of the rotor. A torque curve C1 represents the relationship between the angle and the load torque on the rotary compressor, and a torque curve C2 represents the relationship between the angle and the load torque on the reciprocating compressor.

A comparison between the two torque curves C1 and C2 shows that compression operation causes torque variation in both compressors. Further, the comparison shows that an angular range in which the load torque increases is limited in the reciprocating compressor as compared with in the rotary compressor.

Return to the explanation of FIG. 1. The control unit 6 obtains the current value of the input current of the smoothing unit 4 from the current detection unit 7, and obtains the current values of the second AC power converted by the inverter 5 from the current detection unit 8. The control unit 6 uses the current values detected by the current detection units to control the operation of the inverter 5, specifically, to perform on-off control on the switching elements included in the inverter 5.

In the first embodiment, the control unit 6 controls the inverter 5 such that AC power on sine waves including pulsation corresponding to the pulsation of the power flowing from the rectifier unit 3 into the capacitor 4*a* of the smoothing unit 4 is output from the inverter 5 to the compressor 30. The pulsation corresponding to the pulsation of the power flowing into the capacitor 4*a* is, for example, pulsation that varies depending on the frequency or the like of the pulsation of the power flowing into the capacitor 4*a*. Thus, the control unit 6 reduces current flowing through the capacitor 4*a*. Note that the control unit 6 does not need to use all the detected values obtained from the detection units, and may perform control using some of the detected values.

The control unit 6 performs control such that one of the speed, voltage, and current of the motor reaches a desired state. Here, for the motor 32 used to drive the compressor 30, it is often difficult to attach a position sensor for detecting the rotor position to the motor 32 because of the structure and the cost. Therefore, the control unit 6 performs position sensorless control on the motor 32. For a method of the position sensorless control on the motor 32, there are control methods such as constant primary flux control and sensorless vector control. In the first embodiment, as an example, a description is given based on sensorless vector control. A control method described below can be applied to constant primary flux control with minor changes.

In the motor drive device 10, the arrangement of the components illustrated in FIG. 1 is an example. The arrangement of the components is not limited to the example illustrated in FIG. 1. For example, the reactor 2 may be disposed downstream of the rectifier unit 3. The motor drive device 10 may include a booster unit, or the rectifier unit 3 may have the function of a booster unit.

Next, a characteristic operation in the control unit 6 in the first embodiment will be described. As illustrated in FIG. 1, current output from the rectifier unit 3 to the capacitor 4*a* and the inverter 5 is represented by "I1" and is referred to as a "capacitor input current". Current output from the capacitor 4*a* and input to the inverter 5 is represented by "I2" and is referred to as an "inverter input current". Current flowing into and out of the capacitor 4*a*, that is, current to charge the capacitor 4*a* or current discharged by the capacitor 4*a* is represented by "I3" and is referred to as a "charge and discharge current".

The capacitor input current I1 is affected by the power supply phase of the commercial power supply 1, the characteristics of elements installed before and after the rectifier unit 3, etc. As a result, the capacitor input current I1 has characteristics including the power supply frequency and harmonic components that are frequency components of the products of the power supply frequency multiplied by integers greater than one. In the capacitor 4*a*, when the charge and discharge current I3 is large, aging deterioration of the capacitor 4*a* is accelerated. In particular, when an electrolytic capacitor is used as the capacitor 4*a*, the degree of acceleration of aging deterioration increases. Therefore, the control unit 6 performs control to bring the charge and discharge current I3 close to zero by controlling the inverter 5 such that the capacitor input current I1 and the inverter input current I2 become equal, to reduce the charge and discharge current I3. This can reduce the deterioration of the capacitor 4*a*. However, a ripple component caused by the PWM control is superimposed on the inverter input current I2, and thus the control unit 6 needs to control the inverter 5 by taking into account the ripple component.

The control unit 6 monitors the power state of the capacitor 4*a*, and provides proper pulsation to the motor 32 to reduce the charge and discharge current I3. Here, the power state of the capacitor 4*a* is calculated from the capacitor input current I1, the inverter input current I2, the charge and discharge current I3, a capacitor voltage that is the voltage of the capacitor 4*a*, etc. In the control unit 6, at least one of these information pieces for determining the power state of the capacitor 4*a* is information necessary for the control to reduce the charge and discharge current I3.

Using the detected value of the capacitor input current I1 detected by the current detection unit 7, the control unit 6 controls the inverter 5 such that a value obtained by removing the PWM ripple from the inverter input current I2 matches the capacitor input current I1, to add pulsation to the power output to the motor 32. That is, the control unit 6 controls the operation of the inverter 5 such that pulsation according to the power state of the capacitor 4*a* is superimposed on a drive pattern of the motor 32. This reduces the charge and discharge current I3. In this description, this control is referred to as "power supply pulsation compensation control".

As described above, since the capacitor input current I1 includes the harmonic components of the power supply frequency, the inverter input current I2 also includes the harmonic components of the power supply frequency. Therefore, the motor drive device 10 needs to properly pulsate the inverter input current I2.

Furthermore, it is known that even when the compressor 30 is used, for example, in an air conditioner and the load on the compressor 30 is substantially constant, that is, the effective value of the inverter input current I2 is constant, some types of load on the compressor 30 include a mechanism that causes periodic rotational variation. Therefore, when a compressor load including such a mechanism is driven, the load torque has periodic variation.

Consequently, when constant current load control to drive the compressor 30 is performed with constant output current from the inverter 5, that is, constant torque output, speed variation due to torque difference occurs. There is a characteristic that the speed variation occurs remarkably in the low speed range, and the speed variation decreases as the operating point moves to the high speed range. The amount of the speed variation flows to the outside and thus is externally observed as vibration. It is required to add a vibration-control component, for example. Therefore, a measure is often taken to pass pulsating torque, that is, a pulsating current component through the compressor 30 in addition to constant current output from the inverter 5, that is, current for constant torque output, to apply torque responsive to load torque variation from the inverter 5 to the compressor 30. This can bring the torque difference close to zero to reduce the speed variation of the motor 32 of the compressor 30 to reduce vibration. As a result, the torque difference between the output torque of the inverter 5 and the load torque can be brought close to zero. Consequently, the speed variation of the motor 32 included in the compressor

30 can be reduced, and the vibration of the compressor 30 can be reduced. In this description, this control is referred to as "load pulsation compensation control".

As described above, there are cases where the motor drive device 10 must drive the compressor 30 in the high load range and under the high outside temperature environment. In this case, since the inverter input current I2 inevitably increases, a problem such as a failure of the capacitor 4*a* due to a temperature rise may occur. Further, when the inverter input current I2 increases, failures or the like of a circuit component and a soldered portion of the circuit component due to a temperature rise are conceivable. Furthermore, an increase in motor current flowing through the motor 32 may cause motor demagnetization, resulting in performance degradation, a failure, or the like of the motor 32.

Therefore, the control unit 6 performs control to temporarily weaken the load pulsation compensation control and the power supply pulsation compensation control while performing control to temporarily reduce the rotational speed on a speed command value. This control can reduce the inverter input current I2, and thus can reduce heat generation and a temperature rise. In this description, the operating environment of the motor drive device 10 when placed in the high load range and under the high outside temperature environment is referred to as "overload conditions" or "during overload conditions". Control to reduce the inverter input current I2 performed when the operating environment of the motor drive device 10 is the overload conditions is referred to as "overload compensation control".

As described above, in the motor drive device 10 according to the first embodiment, the control unit 6 performs the constant current load control to control the rotational speed of the motor 32, the load pulsation compensation control to compensate for the load pulsation, the power supply pulsation compensation control to compensate for the power supply pulsation, and the overload compensation control to reduce the inverter input current I2 when the operating environment is the overload conditions. On the other hand, improper allocation by each control may cause a state in which the rotational speed of the motor 32 cannot follow a speed command, the load pulsation compensation control results in overcompensation, or power supply pulsation compensation cannot be satisfactorily controlled, for example. Therefore, in the first embodiment, the motor drive device 10 is operated such that the operation of each control becomes proper. Alternatively, the order of priority among the controls is determined so that the operation of each control becomes proper. The following describes a specific control method.

In this description, as a coordinate system when the control unit 6 performs processing, a dq-axis coordinate system that is suitably used when the motor 32 is a permanent magnet motor is used for explanation, but the coordinate system is not limited thereto. A control system of the control unit 6 may be constructed with a γδ-axis coordinate system that is generally used in position sensorless control.

First, it is an essential matter in the motor drive device 10 that the motor 32 driven follow a speed command. Therefore, the control unit 6 performs control that prioritizes the constant current load control. The control unit 6 sets a limit value for a q-axis current command that is a torque current command and can be used in each of the constant current load control, the power supply pulsation compensation control, and the load pulsation compensation control. Specifically, the control unit 6 sets limit values for the power supply pulsation compensation control and the load pulsation compensation control within a range obtained by subtracting the value of a q-axis current command to be used in the constant current load control from the total limit value of q-axis current commands, and generates q-axis current commands for the power supply pulsation compensation control and the load pulsation compensation control. That is, the control unit 6 performs the load pulsation compensation control to compensate for the load pulsation, and the power supply pulsation compensation control to reduce the charge and discharge current I3 of the capacitor 4*a*, while preferentially performing the constant current load control to control the rotational speed of the motor 32.

Next, a total q-axis current limit value $I_{glim}$ will be described. The total q-axis current limit value $I_{glim}$ varies depending on the value of a d-axis current $I_d$, the speed of the motor 32, etc. In terms of the demagnetization limit of the motor 32 in the low speed range, the maximum current of the inverter 5, etc., the q-axis current limit value $I_{qlim}$ is determined, for example, as in formula (1) below. In this description, the q-axis current limit value $I_{glim}$ is sometimes referred to as a "first limit value".

Formula 1

$$I_{qlim} = \sqrt{\left(\sqrt{3}\, I_{rmslim}\right)^2 - (I_d *)^2} \tag{1}$$

In formula (1), $I_{rmslim}$ represents a phase current limit value expressed as an effective value, and $I_d$* represents a d-axis current command that is an exciting current command. $I_{rmslim}$ is typically set to be lower than a threshold for overcurrent interruption protection in the inverter 5 by about 10% to 20%. In the high speed range, a q-axis current $I_q$ that can be passed decreases due to the effect of voltage saturation. It is well known that when a q-axis current command becomes excessive, control can become unstable due to a wind-up phenomenon in an integrator. In formula (1), a decrease in the maximum q-axis current with an increase in speed is not taken into consideration. Thus, a numerical formula is derived with a decrease in the maximum q-axis current taken into account. In the high speed range, the relationship in an approximate expression of formula (2) is established with respect to $V_{om}$ where $V_{om}$ is the limit value of dq-axis voltage.

Formula 2

$$(\Phi_a + L_d I_d)^2 + (L_q I_q)^2 = \left(\frac{V_{om}}{\omega_e}\right)^2 \tag{2}$$

In formula (2), $V_{om}$ is the radius of the voltage limit circle on the dq plane. Formula (2) is organized by substituting a steady-state voltage equation into $(V_d*)^2+(V_q*)^2=V_{om}^2$, ignoring a voltage drop due to armature resistance. Here, formula (2) is solved for the q-axis current $I_q$ to obtain formula (3).

Formula 3

$$I_q = \pm \frac{1}{L_q}\sqrt{\left(\frac{V_{om}}{\omega_e}\right)^2 - (\Phi_a + L_d I_d)^2} \tag{3}$$

Thus, when the d-axis current $I_d$ is passed to the limit of the limit value, the q-axis current limit value $I_{qlim}$ is expressed as in formula (4).

Formula 4

$$I_{qlim} = \frac{1}{L_q}\sqrt{\left(\frac{V_{om}}{\omega_e}\right)^2 - (\Phi_a + L_d I_{dlim})^2} \tag{4}$$

When the d-axis current $I_d$ is passed until the voltage is minimized, $\phi_a+L_dI_{dlim}=0$. At this time, formula (5) holds. In this case, it is found that the q-axis current limit value $I_{qlim}$ decreases in inverse proportion to the electrical angular velocity $\omega_e$ of the motor 32.

Formula 5

$$I_{qlim} = \frac{V_{om}}{\omega_e L_q} \tag{5}$$

As a final conclusion, the q-axis current limit value $I_{qlim}$ is set as in formula (6) with both formula (1) and formula (4) taken into account.

Formula 6

$$I_{qlim} = \mathrm{MIN}\left(\sqrt{(\sqrt{3}\,I_{rmslim})^2 - (I_d*)^2},\ \frac{1}{L_q}\sqrt{\left(\frac{V_{om}}{\omega_e}\right)^2 - (\Phi_a + L_d I_{dlim})^2}\right) \tag{6}$$

In formula (6), MIN is a function to select a minimum one.

Figure 4:
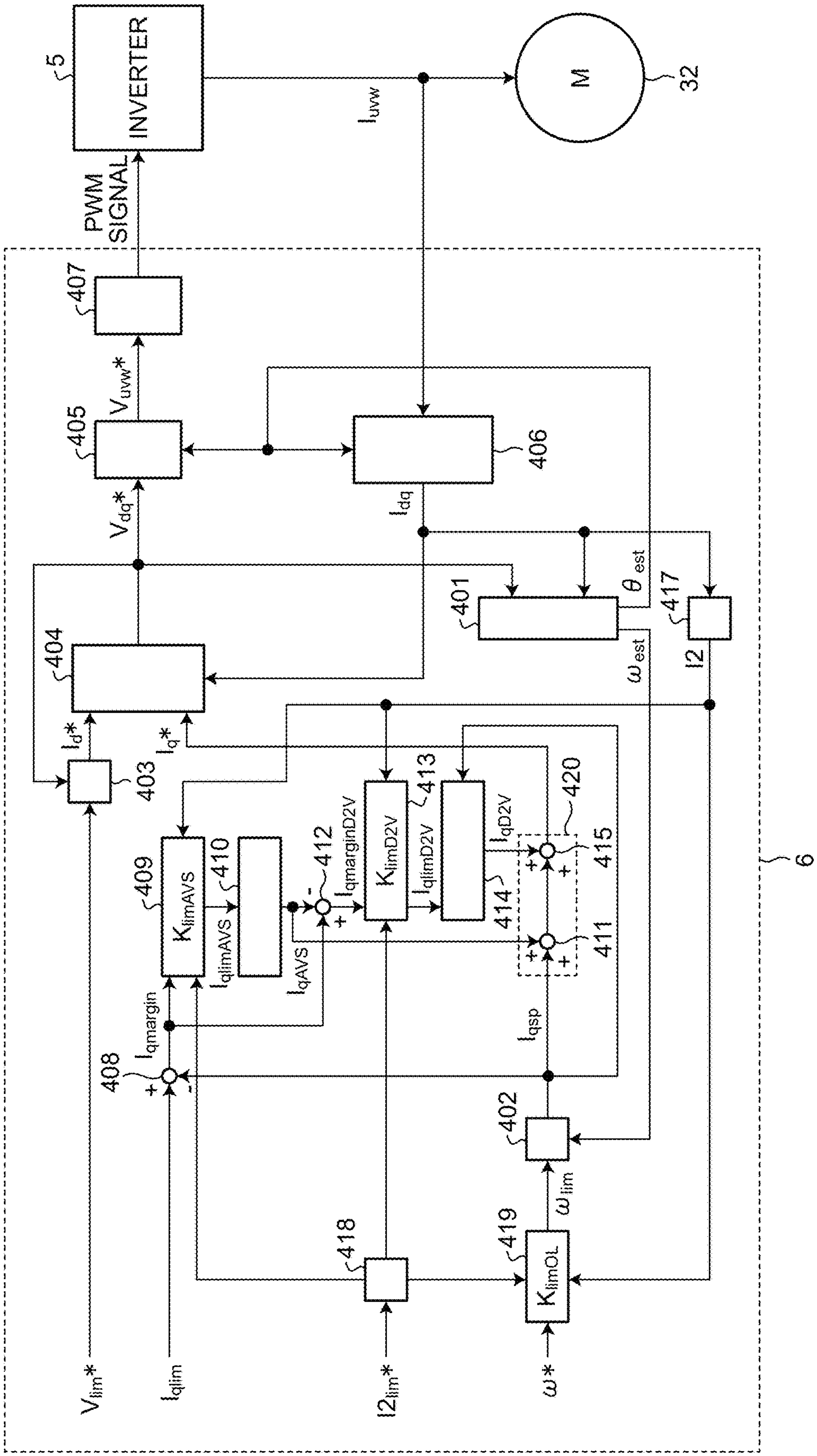
FIG. 4 is a block diagram illustrating an exemplary configuration of a control unit included in the motor drive device according to the first embodiment.

The configuration of the control unit 6 that performs the above calculations will be described. FIG. 4 is a block diagram illustrating an exemplary configuration of the control unit included in the motor drive device according to the first embodiment. The control unit 6 includes a rotor position estimation unit 401, a speed control unit 402, a flux-weakening control unit 403, a current control unit 404, coordinate transformation units 405 and 406, a PWM signal generation unit 407, subtractors 408 and 412, a load pulsation limit unit 409, a load pulsation compensation control unit 410, adders 411 and 415, a power supply pulsation limit unit 413, a power supply pulsation compensation control unit 414, an inverter input current calculation unit 417, a threshold priority order control unit 418, and an overload compensation control unit 419. The adders 411 and 415 constitute a q-axis current command generation unit 420.

For the rotor (not illustrated) included in the motor 32, the rotor position estimation unit 401 estimates an estimated phase angle $\theta_{est}$ that is the direction of the rotor magnetic poles on the dq axes, and an estimated speed $\omega_{est}$ that is the rotor speed, using a dq-axis current vector $I_{dq}$ and a dq-axis voltage command vector $V_{dq}$* for driving the motor 32.

The speed control unit 402 automatically adjusts, that is, generates a q-axis current command $I_{qsp}$ such that an overload compensation speed command $\omega_{lim}$ described later matches the estimated speed West. The q-axis current command $I_{qsp}$ is a torque current command for the above-described constant current load control. In this description, the q-axis current command $I_{qsp}$ is sometimes referred to as a “first torque current command”.

The flux-weakening control unit 403 automatically adjusts a d-axis current command $I_d$* such that the absolute value of the dq-axis voltage command vector $V_{dq}$* falls within the limit value of a voltage limit value $V_{lim}$*. Flux-weakening control has two broad types: a method of calculating the d-axis current command $I_d$* from the voltage limit ellipse equation, and a method of calculating the d-axis current command $I_d$* such that a deviation between the voltage limit value $V_{lim}$* and the absolute value of the dq-axis voltage command vector $V_{dg}$* becomes zero. Either method may be used.

The current control unit 404 automatically adjusts the dq-axis voltage command vector $V_{dq}$* such that the dq-axis current vector $I_{dq}$ follows the d-axis current command $I_d$* and a q-axis current command $I_q$*. In this description, the q-axis current command $I_q$* is sometimes referred to as a “second torque current command”.

The coordinate transformation unit 405 coordinate-transforms the dq-axis voltage command vector $V_{dq}$* from dq coordinates into an AC amount voltage command $V_{uvw}$*, according to the estimated phase angle $\theta_{est}$.

The coordinate transformation unit 406 coordinate-transforms a motor current $I_{uvw}$ flowing through the motor 32 from the amount of AC into the dq-axis current vector $I^{dq}$ in dq coordinates, according to the estimated phase angle $\theta_{est}$. As described above, for the motor current $I_{uvw}$, the control unit 6 can obtain, of the current values of the three phases output from the inverter 5, the current values of the two phases detected by the current detection unit 8, and the current value of the remaining one phase by calculation using the current values of the two phases.

The PWM signal generation unit 407 generates a PWM signal based on the voltage command $V_{uvw}$* coordinate-transformed by the coordinate transformation unit 405. The control unit 6 outputs the PWM signal generated by the PWM signal generation unit 407 to the switching elements of the inverter 5 to apply voltage to the motor 32.

The subtractor 408 generates a first q-axis current margin $I_{qmargin}$ that is the difference between the q-axis current limit value $I_{qlim}$ and the absolute value of the q-axis current command $I_{qsp}$ described above. When the value of the q-axis current command $I_{qsp}$ is positive, calculation of the absolute value is unnecessary. The q-axis current limit value $I_{qlim}$ is a limit value for the q-axis current command $I_q$* to be input to the current control unit 404. The first q-axis current margin $I_{qmargin}$ is the remainder when the amount of current of the q-axis current command $I_{qsp}$ required for the constant current load control is subtracted from the q-axis current limit value $I_{qlim}$, and is a value allocatable to the load pulsation compensation control, the power supply pulsation compensation control, and the overload compensation control. Note that $I_{qlim}-|I_{qsp}|$ is affected by speed pulsation, bus voltage pulsation, etc., and thus the subtractor 408 may perform smoothing using a low-pass filter as in formula (7). In this description, the first q-axis current margin $I_{qmargin}$, which is the difference between the q-axis current limit value $I_{qlim}$ and the q-axis current command $I_{qsp}$, is sometimes referred to as a “first difference”.

Formula 7

$$I_{qmargin} = \frac{1}{1+Ts}(I_{qlim} - |I_{qsp}|) \tag{7}$$

In formula (7), T is the filter time constant and represents the reciprocal of the cutoff angular frequency, and s represents the Laplace transform variable. Next, the control unit 6 allocates the first q-axis current margin $I_{qmargin}$ to the load pulsation compensation control and the power supply pulsation compensation control.

The threshold priority order control unit 418 transmits a preset threshold $I2_{lim}$* to the load pulsation limit unit 409, the power supply pulsation limit unit 413, and the overload compensation control unit 419 according to a predetermined priority order. The threshold $I2_{lim}$* is transmitted to at least one of the load pulsation limit unit 409, the power supply pulsation limit unit 413, and the overload compensation control unit 419 individually, sequentially, or simultaneously, according to the priority order.

In the load pulsation limit unit 409, an input signal is multiplied by a load pulsation compensation limit ratio $K_{limavs}$ for limiting the load pulsation compensation control. In the power supply pulsation limit unit 413, an input signal is multiplied by a power supply pulsation compensation limit ratio $K_{limD2v}$ for limiting the power supply pulsation compensation control. In the overload compensation control unit 419, an input signal is multiplied by an overload compensation limit ratio $K_{limoL}$ for limiting the overload compensation control.

In a specific example of priority control where the inverter input current I2 is reduced only, for example, by the load pulsation compensation control, the power supply pulsation compensation control and the overload compensation control are not limited, and thus the limit ratios for these controls do not decrease. In this example, the load pulsation compensation control is performed until the inverter input current I2 falls below the threshold $I2_{lim}$*. When the inverter input current I2 falls below the threshold $I2_{lim}$*, the limit ratios are restored. In a case where limits are performed in the priority order, when the inverter input current I2 falls below the threshold $I2_{lim}$*, the limit ratios are restored in the reverse order of the priority order. In a case where priorities are not assigned, limits are simultaneously imposed. When the inverter input current I2 falls below the threshold $I2_{lim}$*, the limit ratios are simultaneously restored. The following describes individual operations in the control units.

First, the inverter input current calculation unit 417 obtains the dq-axis current vector $I_{dq}$ from the coordinate transformation unit 406, and calculates the inverter input current I2 using the d-axis current $I_d$ and the q-axis current $I_q$ as shown in formula (8).

Formula 8

$$I2 = \sqrt{I_d^2 + I_q^2} \quad (8)$$

The load pulsation limit unit 409 obtains the first q-axis current margin $I_{qmargin}$ from the subtractor 408, obtains the inverter input current I2 from the inverter input current calculation unit 417, and obtains the threshold $I2_{lim}$* from the threshold priority order control unit 418. The load pulsation limit unit 409 determines the load pulsation compensation limit ratio $K_{limAVS}$ in the load pulsation compensation control by comparing the inverter input current I2 with the threshold $I2_{lim}$*. As shown in formula (9), the load pulsation limit unit 409 multiplies the first q-axis current margin $I_{qmargin}$ obtained from the subtractor 408 by the load pulsation compensation limit ratio $K_{limAVS}$ to generate a current limit value $I_{qlimAVS}$ for the load pulsation compensation control. In this description, the load pulsation compensation limit ratio $K_{limAVS}$ is sometimes referred to as a "first limit ratio", and the load pulsation limit unit 409 is sometimes referred to as a "first limit ratio multiplier".

Formula 9

$$I_{qlimAVS} = K_{limAVS} I_{qmargin} \quad (9)$$

The load pulsation compensation limit ratio $K_{limAVS}$ is a limit ratio for the first q-axis current margin $I_{qmargin}$, and is a variable greater than or equal to zero and less than or equal to one. The load pulsation compensation limit ratio $K_{limAVS}$ may be set according to the power state of the capacitor 4*a*, the operating state of the motor 32, the operating state of an air conditioner when the motor drive device 10 is used as a refrigeration cycle apparatus in the air conditioner, etc. Thus, the current limit value $I_{qlimAVS}$ for the load pulsation compensation control is set using the first q-axis current margin $I_{qmargin}$. In this description, the current limit value $I_{qlimAVS}$ for the load pulsation compensation control is sometimes referred to as a "second limit value".

Here, a method by which the load pulsation limit unit 409 determines the load pulsation compensation limit ratio $K_{limAVS}$ will be supplemented. As described above, the q-axis current Iq that can be used in the power supply pulsation compensation control and the load pulsation compensation control is limited. Therefore, the load pulsation limit unit 409 determines the load pulsation compensation limit ratio $K_{limAVS}$ to determine the priority order of the load pulsation compensation control and the power supply pulsation compensation control with respect to each compensation control. In the first embodiment, to determine the limit ratio of the q-axis current Iq, the load pulsation limit unit 409 determines the load pulsation compensation limit ratio $K_{limAVS}$, based on the inverter input current I2, the priority order of the load pulsation compensation control, the power supply pulsation compensation control, and the overload compensation control, and the threshold $I2_{lim}$*.

The load pulsation compensation control unit 410 generates a load pulsation compensation q-axis current command $I_{qAVS}$, using the current limit value $I_{qlimAVS}$ for the load pulsation compensation control. The load pulsation compensation q-axis current command $I_{qAVS}$ is a torque current command for the load pulsation compensation control. Specifically, the load pulsation compensation control unit 410 performs the load pulsation compensation control within the current limit value $I_{qlimAVS}$ for the load pulsation compensation control generated by the load pulsation limit unit 409, and generates the load pulsation compensation q-axis current command $I_{qAVS}$. The load pulsation compensation q-axis current command $I_{qAVS}$ is expressed as in formula (10). The magnitude relationships among the first q-axis current margin $I_{qmargin}$, the current limit value $I_{qlimAVS}$ for the load pulsation compensation control, and the load pulsation compensation q-axis current command $I_{qAVS}$ are $I_{qmargin} \leq I_{qlimAVS} \geq I_{qAVS}$. In this description, the load pulsation compensation q-axis current command $I_{qAVS}$ is sometimes referred to as a "first compensation value".

Formula 10

$$I_{qAVS} = \sqrt{(I_{qAVScos})^2 + (I_{qAVSsin})^2} \quad (10)$$

In the control of the first embodiment, there may be cases where the load pulsation compensation control unit 410 does not use up the current limit value $I_{qlimAVS}$ for the load pulsation compensation control. Therefore, as shown in formula (11), the subtractor 412 generates a second q-axis current margin $I_{qmarginD2V}$ that is the difference between the first q-axis current margin $I_{qmargin}$ and the load pulsation compensation q-axis current command $I_{qAVS}$. In this description, the second q-axis current margin $I_{qmarginD2V}$ is sometimes referred to as a "second difference".

Formula 11

$$I_{qmarginD2V} = I_{qmargin} - I_{qAVS} \tag{11}$$

The power supply pulsation limit unit 413 obtains the second q-axis current margin $I_{qmarginD2V}$ from the subtractor 412, obtains the inverter input current I2 from the inverter input current calculation unit 417, and obtains the threshold $I2_{lim}$* from the threshold priority order control unit 418. The power supply pulsation limit unit 413 determines the power supply pulsation compensation limit ratio $K_{limD2V}$ in the power supply pulsation compensation control by comparing the inverter input current I2 with the threshold $I2_{lim}$*. As shown in formula (12), the power supply pulsation limit unit 413 multiplies the second q-axis current margin $I_{qmarginD2V}$ obtained from the subtractor 412 by the power supply pulsation compensation limit ratio $K_{limD2V}$ to generate a current limit value $I_{qlimD2V}$ for the power supply pulsation compensation control. In this description, the power supply pulsation compensation limit ratio $K_{limD2V}$ is sometimes referred to as a "second limit ratio", and the power supply pulsation limit unit 413 is sometimes referred to as a "second limit ratio multiplier".

Formula 12

$$I_{qlimD2V} = K_{limD2V} I_{qmarginD2V} \tag{12}$$

The power supply pulsation compensation limit ratio $K_{limD2V}$ is a limit ratio for the second q-axis current margin $I_{qmarginD2V}$, and is a variable greater than or equal to zero and less than or equal to one. The power supply pulsation compensation limit ratio $K_{limD2V}$ may be set according to the power state of the capacitor 4*a*, the operating state of the motor 32, the operating state of an air conditioner when the motor drive device 10 is used as a refrigeration cycle apparatus in the air conditioner, etc. Thus, the current limit value $I_{qlimD2V}$ for the power supply pulsation compensation control is set using the second q-axis current margin $I_{qmarginD2V}$. In this description, the current limit value $I_{qlimD2V}$ for the power supply pulsation compensation control is sometimes referred to as a "third limit value".

The power supply pulsation compensation control unit 414 generates a current amplitude $I_{qD2V}$ for the power supply pulsation compensation control, using the current limit value $I_{qlimD2V}$ for the power supply pulsation compensation control. The current amplitude $I_{qD2V}$ for the power supply pulsation compensation control is a torque current command for the power supply pulsation compensation control. Specifically, the power supply pulsation compensation control unit 414 determines the current amplitude $I_{qD2V}$ for the power supply pulsation compensation control as in formula (13). When the absolute value of the q-axis current command $I_{qsp}$ is greater than or equal to the current limit value $I_{qlimD2V}$ for the power supply pulsation compensation control, the power supply pulsation compensation control unit 414 selects the current limit value $I_{qlimD2V}$ for the power supply pulsation compensation control as the current amplitude $I_{gD2V}$ for the power supply pulsation compensation control. When the absolute value of the q-axis current command $I_{qsp}$ is less than the current limit value $I_{qlimD2V}$ for the power supply pulsation compensation control, the power supply pulsation compensation control unit 414 selects the absolute value of the q-axis current command $I_{qsp}$ as the current amplitude $I_{qD2V}$ for the power supply pulsation compensation control. In this description, the current amplitude $I_{qD2V}$ is sometimes referred to as a "second compensation value".

Formula 13

$$\text{if } I_{qlimD2V} \le |I_{qsp}| \tag{13}$$

$$\text{then } I_{qD2V} = I_{qlimD2V}$$

$$\text{else } I_{qD2V} = |I_{qsp}|$$

In the processing of formula (13) above, when the absolute value of the q-axis current command $I_{qsp}$ is equal to the current limit value $I_{qlimD2V}$ for the power supply pulsation compensation control, the current limit value $I_{qlimD2V}$ for the power supply pulsation compensation control is selected, but the present invention is not limited thereto. When the absolute value of the q-axis current command $I_{qsp}$ is equal to the current limit value $I_{qlimD2V}$ for the power supply pulsation compensation control, the absolute value of the q-axis current command $I_{qsp}$ may be selected.

The q-axis current command generation unit 420 generates the q-axis current command $I_q$* using the q-axis current command $I_{qsp}$, the load pulsation compensation q-axis current command $I_{qAVS}$, and the current amplitude $I_{qD2V}$ for the power supply pulsation compensation control. Specifically, in the q-axis current command generation unit 420, the adder 411 adds the q-axis current command $I_{qsp}$ and the load pulsation compensation q-axis current command $I_{qAVS}$. The adder 415 adds the result of the addition by the adder 411, which is the q-axis current command $I_{qsp}$+the load pulsation compensation q-axis current command $I_{qAVS}$, and the current amplitude $I_{qD2V}$ for the power supply pulsation compensation control. The q-axis current command generation unit 420 outputs the result of the addition by the adder 415 as the q-axis current command $I_q$* to the current control unit 404.

The overload compensation control unit 419 obtains a speed command ω*, obtains the inverter input current I2 from the inverter input current calculation unit 417, and obtains the threshold $I2_{lim}$* from the threshold priority order control unit 418. The overload compensation control unit 419 determines the overload compensation limit ratio $K_{limOL}$ in the overload compensation control by comparing the inverter input current I2 with the threshold $I2_{lim}$*. As shown in formula (14), the overload compensation control unit 419 multiplies the speed command ω* by the overload compensation limit ratio $K_{limOL}$ to generate the overload compensation speed command $\omega_{lim}$. In this description, the overload compensation limit ratio $K_{limOL}$ is sometimes referred to as a "third limit ratio", and the overload compensation control unit 419 is sometimes referred to as a "third limit ratio multiplier".

Formula 14

$$\omega_{lim} = K_{limOL}\omega* \tag{14}$$

When the motor drive device 10 is used as a refrigeration cycle apparatus in an air conditioner or the like, the speed command ω* is based, for example, on a temperature detected by a temperature sensor (not illustrated), information indicating a set temperature specified from a remote controller that is an operating unit (not illustrated), operation mode selection information, instruction information on an operation start and an operation end, etc. Examples of operation modes include heating, cooling, and dehumidification.

By the multiplication of the speed command ω* by the overload compensation limit ratio $K_{limOL}$, the rotational speed can be temporarily limited. Acceleration and deceleration control for limiting the rotational speed is performed according to the acceleration and deceleration rate of the motor 32. In this description, the overload compensation speed command $\omega_{lim}$ is sometimes referred to as a "third compensation value".

As described above, the speed control unit 402 automatically adjusts the q-axis current command $I_{qsp}$ such that the overload compensation speed command $\omega_{lim}$ matches the estimated speed West. That is, the q-axis current command $I_{qsp}$, which is the first torque current command, is compensated for by the overload compensation speed command $\omega_{lim}$, which is the third compensation value.

Next, the threshold $I2_{lim}$* will be described. As described above, the threshold $I2_{lim}$* is a control parameter used in control to limit the inverter input current I2. The threshold $I2_{lim}$* varies depending on the rotational speed of the motor 32, the ambient temperature of the motor drive device 10, etc. In this description, the threshold $I2_{lim}$* is sometimes referred to as a "fourth limit value".

With respect to the q-axis current limit value $I_{qlim}$, the threshold $I2_{lim}$* is affected by various factors such as the heat dissipation structure and circuit configuration of the inverter 5, the capacitor capacitance, and the operating environment, and thus is set to a value obtained by determining a value by performing a test and providing a margin of about 10% to the value determined by the test.

As described above, the range of values that can be taken on by the load pulsation compensation limit ratio $K_{limAVS}$, the power supply pulsation compensation limit ratio $K_{limD2V}$, and the overload compensation limit ratio $K_{limOL}$, which are set based on the threshold $I2_{lim}$*, is greater than or equal to zero and less than or equal to one for all the three limit ratios. When the inverter input current I2 is higher than or equal to the threshold $I2_{lim}$* or exceeds the threshold $I2_{lim}$*, the value of each limit ratio is gradually decreased from one. The priority order in which the three limit ratios are decreased is affected by various factors such as the heat dissipation structure and circuit configuration of the inverter 5, the capacitor capacitance, and the operating environment, and is also affected by performance required of the inverter 5, the demagnetization limit of the motor 32 in the high speed range, etc. Therefore, it is also desirable to determine the priority order by performing a test. Further, it is also desirable to determine a lower limit of how much to decrease by performing a test. As for how to decrease the limit ratios when the threshold $I2_{lim}$* is exceeded, the limit ratios can be basically decreased linearly in accordance with increases in the inverter input current I2. However, there is no problem in making the amount of decrease nonlinear by using a high-order function, for example.

As described above, the control unit 6 changes the load pulsation compensation limit ratio $K_{limAVS}$, the power supply pulsation compensation limit ratio $K_{limD2V}$, and the overload compensation limit ratio $K_{limOL}$ according to the circumstances, to appropriately set those values. This makes it possible to properly perform the power supply pulsation compensation control, the load pulsation compensation control, and the overload compensation control while following the speed command ω*.

Figure 5:
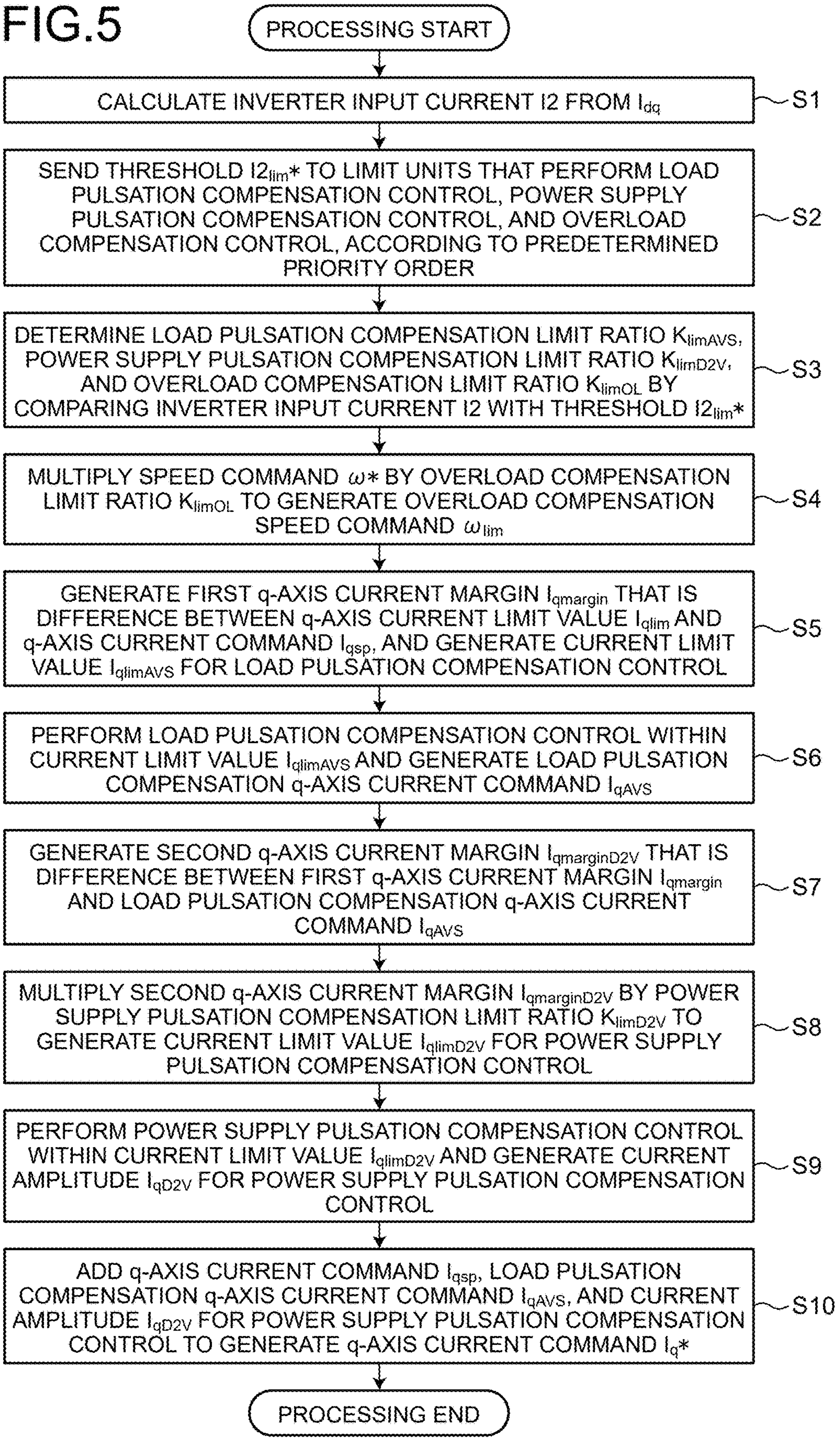
FIG. 5 is a flowchart for explaining the operations of principal components in the control unit included in the motor drive device according to the first embodiment.

Next, the operations of the units in the control unit 6 described above will be described in an operating mode as viewed from the entire control unit 6. FIG. 5 is a flowchart for explaining the operations of principal components in the control unit included in the motor drive device according to the first embodiment.

The control unit 6 calculates the inverter input current I2 from the dq-axis current vector $I_{dq}$ (step S1).

The control unit 6 sends the threshold $I2_{lim}$* to limit units that perform the power supply pulsation compensation control, the load pulsation compensation control, and the overload compensation control, according to a predetermined priority order (step S2). The limit units referred to here are the load pulsation limit unit 409, the power supply pulsation limit unit 413, and the overload compensation control unit 419 described above.

The control unit 6 determines the load pulsation compensation limit ratio $K_{limAVS}$, the power supply pulsation compensation limit ratio $K_{limD2V}$, and the overload compensation limit ratio $K_{limOL}$ by comparing the inverter input current I2 with the threshold $I2_{lim}$* (step S3).

The control unit 6 multiplies the speed command ω* by the overload compensation limit ratio $K_{limOL}$ to generate the overload compensation speed command $\omega_{lim}$ (step S4). The overload compensation speed command $\omega_{lim}$ is generated as the limit value of the speed command ω*.

The control unit 6 generates the first q-axis current margin $I_{qmargin}$, which is the difference between the q-axis current limit value $I_{qlim}$ and the absolute value of the q-axis current command $I_{qsp}$, and generates the current limit value $I_{qlimAVS}$ for the load pulsation compensation control (step S5). As described above, the current limit value $I_{qlimAVS}$ for the load pulsation compensation control is generated by multiplying the first q-axis current margin $I_{qmargin}$ by the load pulsation compensation limit ratio $K_{limAVS}$.

The control unit 6 performs the load pulsation compensation control within the current limit value $I_{qlimAVS}$ and generates the load pulsation compensation q-axis current command $I_{qAVS}$ (step S6).

The control unit 6 generates the second q-axis current margin $I_{qmarginD2V}$, which is the difference between the first q-axis current margin $I_{qmargin}$ and the load pulsation compensation q-axis current command $I_{qAVS}$ (step S7). As described above, the second q-axis current margin $I_{qmarginD2V}$ is a q-axis current margin for the power supply pulsation compensation control.

The control unit 6 multiplies the second q-axis current margin $I_{qmarginD2V}$ by the power supply pulsation compensation limit ratio $K_{limD2V}$ to generate the current limit value $I_{qlimD2V}$ for the power supply pulsation compensation control (step S8).

The control unit 6 performs the power supply pulsation compensation control within the current limit value $I_{qlimD2V}$ and generates the current amplitude $I_{qD2V}$ for the power supply pulsation compensation control (step S9).

The control unit 6 adds the q-axis current command $I_{qsp}$, the load pulsation compensation q-axis current command $I_{qAVS}$, and the current amplitude $I_{qD2V}$ for the power supply pulsation compensation control to generate the q-axis current command $I_q$* (step S10).

Figure 6:
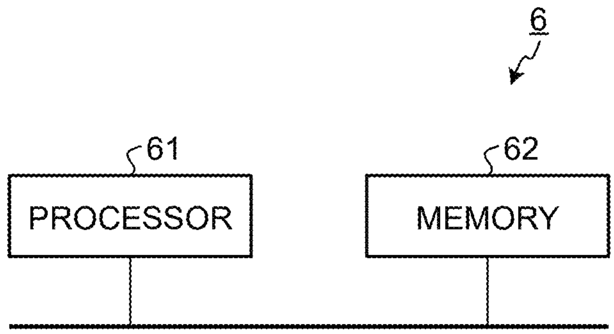
FIG. 6 is a diagram illustrating an example of a hardware configuration that implements the control unit included in the motor drive device according to the first embodiment.

Next, a hardware configuration of the control unit 6 will be described. FIG. 6 is a diagram illustrating an example of a hardware configuration that implements the control unit included in the motor drive device according to the first embodiment.

The control unit 6 is implemented by a processor 61 and a memory 62. The processor 61 is a central processing unit (CPU), a central processor, a processing device, an arithmetic device, a microcomputer, a microprocessor, a digital signal processor (DSP), or a system large-scale integration (LSI). The memory 62 can be exemplified by nonvolatile or volatile semiconductor memory such as read-only memory (ROM), random-access memory (RAM), flash memory, an erasable programmable read-only memory (EPROM), or an electrically erasable programmable read-only memory (EEPROM) (registered trademark). The memory 62 is not limited to these and may be a magnetic disk, an optical disk, a compact disc, a mini disc, or a digital versatile disc (DVD).

As described above, the motor drive device according to the first embodiment includes the rectifier unit, the capacitor connected to the output end of the rectifier unit, the inverter connected across the capacitor, and the control unit. The rectifier unit rectifies the first AC power supplied from the commercial power supply. The inverter generates the second AC power and outputs the second AC power to the motor. The control unit controls the operation of the inverter such that pulsation according to the power state of the capacitor is superimposed on the drive pattern of the motor, to reduce the charge and discharge current of the capacitor. The control unit performs the load pulsation compensation control to compensate for the load pulsation, the power supply pulsation compensation control to reduce the charge and discharge current of the capacitor, and the overload compensation control to reduce the inverter input current input to the inverter, while preferentially performing the constant current load control to control the rotational speed of the motor. This can prevent a decrease in the reliability of the unit even in driving in the high load range and under the high outside temperature environment. Furthermore, since the motor current can be reduced by reducing the inverter input current, it is possible to prevent performance degradation and failures due to the demagnetization of the motor.

In the motor drive device according to the first embodiment, the control unit can be configured with the speed control unit, the load pulsation compensation control unit, the power supply pulsation compensation control unit, and the overload compensation control unit. The speed control unit generates the first torque current command that is a command for the constant current load control in a rotating coordinate system. The load pulsation compensation control unit generates the first compensation value for the load pulsation compensation control, using the second limit value set using the first difference between the first limit value for the first torque current command and the first torque current command. The power supply pulsation compensation control unit generates the second compensation value for the power supply pulsation compensation control, using the third limit value set using the second difference between the first difference and the first compensation value. The overload compensation control unit generates the third compensation value for the overload compensation control, using the fourth limit value.

In the configuration of the control unit, the second limit value is generated by multiplying the first difference by the first limit ratio greater than or equal to zero and less than or equal to one. The third limit value is generated by multiplying the second difference by the second limit ratio greater than or equal to zero and less than or equal to one. The third compensation value is generated by multiplying the rotational speed command by the third limit ratio greater than or equal to zero and less than or equal to one. Thus, the first torque current command that is the basis of the voltage command vector for driving the motor is compensated for by the third compensation value.

In the motor drive device according to the first embodiment, the first torque current command is limited by at least one of the first to third limit ratios, and the first to third limit ratios are assigned priorities for use. Alternatively, the first torque current command is limited by at least one of the first to third limit ratios, and the first to third limit ratios have a lower limit set for use. Then, the first to third limit ratios can be changed based on the inverter input current. This makes it possible to properly perform the power supply pulsation compensation control, the load pulsation compensation control, and the overload compensation control while following the speed command. As a result, an event such as an inability to follow the speed command, excessive compensation of the load pulsation compensation, or unsatisfactory control of the power supply pulsation compensation can be prevented from occurring.

Second Embodiment

In the first embodiment, the load pulsation compensation limit ratio $K_{limAVS}$, the power supply pulsation compensation limit ratio $K_{limD2V}$, and the overload compensation limit ratio $K_{limOL}$ are determined based on the inverter input current I2. In the second embodiment, these three limit ratios are determined based on temperature information. The configuration of a motor drive device according to the second embodiment is the same as the configuration of the motor drive device 10 according to the first embodiment. The flow of processing by a control unit according to the second embodiment is also the same as the flow of the processing illustrated in the flowchart of FIG. 5. In the second embodiment, only differences from the first embodiment will be described, and duplicate content will not be described.

In the second embodiment, in the motor drive device 10, the load pulsation compensation limit ratio $K_{limAVS}$, the power supply pulsation compensation limit ratio $K_{limD2V}$, and the overload compensation limit ratio $K_{limOL}$ are determined, based on temperature information on a part where the rise of temperature is severe, instead of the inverter input current I2. An example of the part where the rise of temperature is severe is the inverter 5 or the capacitor 4*a*.

The temperature information may be obtained by a method of direct detection using a temperature sensor such as a thermocouple, or by an indirect method without using a temperature sensor. One example is a method of estimating the temperature of an area of interest from a loss due to current flowing into the area of interest.

As described above, according to the motor drive device of the second embodiment, in the configuration and control of the motor drive device of the first embodiment, the first to third limit ratios can be changed based on the temperature information on the inverter 5 or the capacitor 4*a*. This makes it possible to properly perform the power supply pulsation compensation control, the load pulsation compensation control, and the overload compensation control while following the speed command. As a result, the same effects as in the first embodiment are achieved, that is, an event such as an inability to follow the speed command, excessive compensation of the load pulsation compensation, or unsatisfactory control of the power supply pulsation compensation can be prevented from occurring.

The configurations described in the above embodiments illustrate an example, and can be combined with another known art. The embodiments can be combined with each other. The configurations can be partly omitted or changed without departing from the gist.

The invention claimed is:

1. A motor drive device comprising:
a rectifier to rectify first AC power supplied from a commercial power supply;
a capacitor connected to an output end of the rectifier;
an inverter connected across the capacitor, to generate second AC power and output the second AC power to a motor; and
an operation controller to control operation of the inverter such that pulsation according to a power state of the capacitor is superimposed on a drive pattern of the motor, to reduce a charge and discharge current of the capacitor, wherein
the operation controller performs load pulsation compensation control to compensate for load pulsation, power supply pulsation compensation control to reduce the charge and discharge current of the capacitor, and overload compensation control to reduce an inverter input current input to the inverter, while preferentially performing constant current load control to control a rotational speed of the motor.

2. A refrigeration cycle apparatus, comprising the motor drive device according to claim 1.

3. The motor drive device according to claim 1, wherein
overload compensation control operates to reduce the inverter input current when an operating environment of the motor drive device is in overload conditions, and
overload conditions occur when a load range of the motor drive device is above a load threshold and a temperature outside the motor drive device is above a temperature threshold.

4. A motor drive device comprising:
a rectifier to rectify first AC power supplied from a commercial power supply;
a capacitor connected to an output end of the rectifier;
an inverter connected across the capacitor, to generate second AC power and output the second AC power to a motor; and
an operation controller to control operation of the inverter such that pulsation according to a power state of the capacitor is superimposed on a drive pattern of the motor, to reduce a charge and discharge current of the capacitor,
wherein
the operation controller performs load pulsation compensation control to compensate for load pulsation, power supply pulsation compensation control to reduce the charge and discharge current of the capacitor, and overload compensation control to reduce an inverter input current input to the inverter, while preferentially performing constant current load control to control a rotational speed of the motor, and
the operation controller includes
a speed controller to generate a first torque current command that is a command for the constant current load control in a rotating coordinate system,
a load pulsation compensation controller to generate a first compensation value for the load pulsation compensation control, using a second limit value set using a first difference between a first limit value for the first torque current command and the first torque current command,
a power supply pulsation compensation controller to generate a second compensation value for the power supply pulsation compensation control, using a third limit value set using a second difference between the first difference and the first compensation value, and
an overload compensation controller to generate a third compensation value for the overload compensation control, using a fourth limit value.

5. The motor drive device according to claim 4, wherein
the second limit value is generated by multiplying the first difference by a first limit ratio greater than or equal to zero and less than or equal to one,
the third limit value is generated by multiplying the second difference by a second limit ratio greater than or equal to zero and less than or equal to one,
the third compensation value is generated by multiplying a rotational speed command by a third limit ratio greater than or equal to zero and less than or equal to one, and
the first torque current command is compensated for by the third compensation value.

6. The motor drive device according to claim 5, wherein
the first torque current command is limited by at least one of the first to third limit ratios, and the first to third limit ratios are assigned priorities for use.

7. The motor drive device according to claim 6, wherein
the first to third limit ratios can be changed based on the inverter input current.

8. A refrigeration cycle apparatus, comprising the motor drive device according to claim 7.

9. A refrigeration cycle apparatus, comprising the motor drive device according to claim 6.

10. The motor drive device according to claim 5, wherein
the first torque current command is limited by at least one of the first to third limit ratios, and the first to third limit ratios have a lower limit set for use.

11. The motor drive device according to claim 10, wherein
the first to third limit ratios can be changed based on the inverter input current.

12. A refrigeration cycle apparatus, comprising the motor drive device according to claim 11.

13. A refrigeration cycle apparatus, comprising the motor drive device according to claim 10.

14. The motor drive device according to claim 5, wherein
the first to third limit ratios can be changed based on the inverter input current.

15. A refrigeration cycle apparatus, comprising the motor drive device according to claim 14.

16. The motor drive device according to claim 5, wherein
the first to third limit ratios can be changed based on temperature information on the inverter or the capacitor.

17. A refrigeration cycle apparatus, comprising the motor drive device according to claim 16.

18. A refrigeration cycle apparatus, comprising the motor drive device according to claim 5.

19. A refrigeration cycle apparatus, comprising the motor drive device according to claim 4.

* * * * *